Oct. 6, 1970 D. C. BOWLES 3,533,010

AMPLITUDE REGULATED OSCILLATOR HIGH VOLTAGE SOURCE

Filed Aug. 15, 1968

INVENTOR
DONALD C. BOWLES
BY [signature]
ATTORNEYS

United States Patent Office 3,533,010

Patented Oct. 6, 1970

3,533,010
AMPLITUDE REGULATED OSCILLATOR HIGH VOLTAGE SOURCE

Donald C. Bowles, Lewisham, England, assignor to Elliott Brothers (London) Limited, London, England, a British company Filed Aug. 15, 1968, Ser. No. 752,923
Claims priority, application Great Britain, Aug. 17, 1967, 37,833/67
Int. Cl. H02m *3/22;* H03b *3/14;* H03k *3/16*
U.S. Cl. 331—75 4 Claims

ABSTRACT OF THE DISCLOSURE

A stabilised high voltage source comprises an oscillator feeding two Cockroft-Walton voltage multiplier circuits in parallel. The outputs of the two multiplier circuits supply a potential divider including a corona stabiliser. A comparator adjusts the oscillator output until the voltage at a tapping point on the divider equals a reference voltage.

The invention relates to stabilised high voltage electrical sources.

According to the invention, there is provided a stabilised high voltage electrical source, comprising an electrical oscillator circuit, rectifying circuitry transformer-coupled to receive the output from the oscillator circuit and operative to develop therefrom a high unidirectional voltage, voltage smoothing means connected to the output of the rectifying circuitry, a potential divider network including a corona stabiliser, the network being connected to be energised from the smoothing means, and comparing means operative to compare the voltage at a tapping point on the potential divider with a reference voltage and responsive to any difference therebetween to adjust the amplitude of the output of the oscillator circuit in a direction tending to reduce the difference to zero.

According to the invention, there is provided a stabilised high voltage source, comprising an oscillator circuit, a voltage multiplying and rectifying circuit transformer-coupled to the oscillator output and operative to develop therefrom a high unidirectional voltage, a corona stabiliser connected to stabilise the unidirectional voltage, and comparing means connected to compare the stabilised unidirectional voltage with a reference voltage and responsive to any difference therebetween to adjust the amplitude of the output of the oscillator in a direction tending to reduce the difference to zero, the voltage multiplying and rectifying circuit comprising two Cockroft-Walton circuits connected in parallel across the secondary winding of a transformer energised by the oscillator output, the rectifying diodes of one of the Cockroft-Walton circuits being oppositely poled as compared with the corresponding diodes in the other Cockroft-Walton circuit whereby the output voltage of one of the Cockroft-Walton circuits has the opposite polarity to the output from the other Cockroft-Walton circuit, the high unidirectional voltage being developed between the most positive terminal of one Cockroft-Walton circuit and the most negative terminal of the other Cockroft-Walton circuit.

A stabilised high voltage source embodying the invention will now be described, by way of example only, with reference to the accompanying drawings in which.

Figure 1:
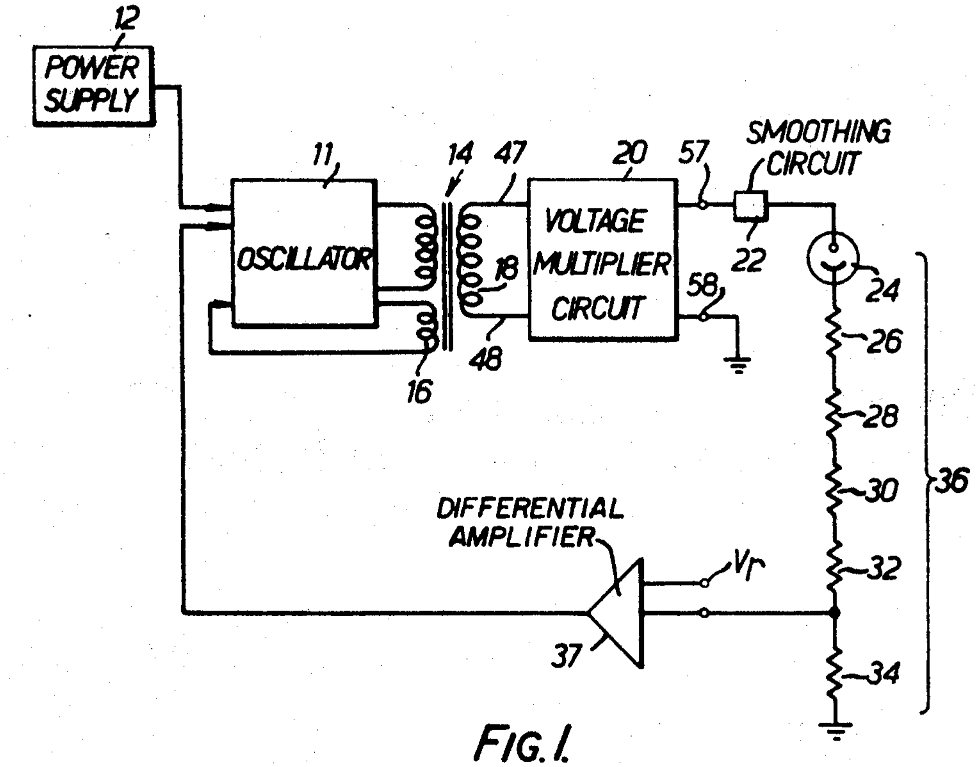
FIG. 1 is a block circuit diagram of the source.

The stabilised high voltage source comprises an oscillator 11 which is energised from a power supply 12 and which feeds the primary winding of a transformer 14. The oscillator is arranged to operate in class C and derives its regenerative feedback by means of a winding 16 on the transformer 14, this winding being connected to the input of the oscillator. The secondary winding 18 of the transformer 14 feeds a Cockroft-Walton voltage multiplier circuit 20 whose ouput is connected, through a smoothing circuit 22, to a corona stabiliser 24 which is connected in series with a chain of resistors 26 to 34, the latter resistor being connected to circuit ground. The corona stabiliser 24, together with the resistors 26 to 34, form a potential divider 36 and a tapping therefrom feeds one input of a differential amplifier 37 whose other input is fed with a reference voltage V*r*. The output of the differential amplifier 37 feeds a controlling input of the oscillator 11 whereby to control the amplitude of the oscillations.

Figure 2:
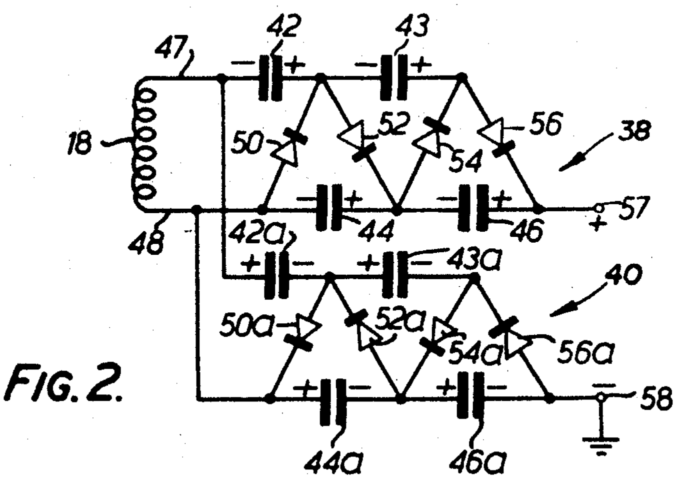
FIG. 2 is a schematic circuit diagram of part of the circuit of FIG. 1.

The voltage multiplier circuit 20 comprises two sections 38 and 40 as shown in FIG. 2. Each of these sections comprises a Cockroft-Walton circuit. Thus, the section 38 comprises two chains of capacitors 42, 43, and 44, 46 which chains are respectively connected to opposite ends 47, 48 of the primary winding 18. Diodes 50 to 56 interconnect the junctions between the capacitors in one chain and the junctions between the capacitors in the other chain, diode 56 being connected to an output terminal 57 which is connected to the smoothing circuit 22 (FIG. 1). The section 40 is generally similar to the section 38 and its components have corresponding reference numerals which are distinguished by the addition of the suffix *a*; however, it will be noted that the diodes 50*a* to 56*a* of section 40 are reversely connected as compared with the diodes 50 and 56 of the section 38. Diode 56*a* is connected to a grounded terminal 58.

In operation, the voltage multiplier circuit 20 is energised by the oscillations from the oscillator 11. Capacitor 42 (FIG. 2) becomes charged to E volts, where E is the peak value of the oscillator output, and capacitors 43, 44, and 46 each become charged to 2E volts, the polarities being as shown in FIG. 2. Similarly, in section 40, capacitor 42*a* is charged to E volts while the other capacitors are charged to 2E volts, the polarities again being as indicated in FIG. 2 which shows that they are the reverse of the polarities in section 38. Thus, the voltage of terminal 57 becomes four times that of the end 48 of winding 18 and eight times that of terminal 58.

The output voltage at terminal 57 is smoothed in the smoothing circuit 22 and applied across the potential divider chain 36 where it is sufficient to produce a corona discharge in the stabiliser 24. The differential amplifier 37 compares the voltage tapped off the potential divider 36 with the reference voltage V*r*. Any difference voltage between the two values compared produces a feedback signal by which the amplifier 37 adjusts the amplitude of the oscillator output in such a sense as to reduce the difference to zero. Alteration of the position of the tapping point on the potential divider 36 enables adjustment to be made to compensate for manufacturers' tolerances in commercially available corona stabilisers.

The arrangement of the voltage multiplier 20 in two sections 38 and 40 is advantageous in that the rectified output voltage produced has a ripple frequency which is twice the operating frequency of the oscillator and thus smoothing is easier. This follows from the fact that the capacitors in the section 38 are charged on positive half cycles of the voltage across secondary winding 18, while the capacitors in the section 40 are charged on negative half cycles. Furthermore, the values of the capacitors in the multiplier 20 can have lower values, for a given regulation, than would be the case if the multiplier comprised a single section. This follows from the fact that each capacitor in a chain has to supply charge to the succeeding capacitor or capacitors in the chain and thus the last capacitor in the chain should be much smaller than the first. By splitting the multiplier up into two sections, the number of capacitors in each chain is effectively halved, and thus so is the maximum change in capacitor value. Although FIG. 2 shows only two capacitors in each chain, it will be appreciated that there could be more than two, an appropriatae number of further diodes being provided as well.

What is claimed is:

1. A stabilised high voltage electrical source, comprising electrical oscillator circuit means having a power input, an output and a control input, a power source connected to the power input of the oscillator circuit means to energise the latter, two Cockroft-Walton multiplying circuits each comprising two chains of capacitors with diodes interconnecting the junctions of the capacitors in one of the chains with the junctions in the other of the chains and each circuit having an input and an output, means connecting the two inputs in parallel and the two outputs in series, transformer means coupling the output of the oscillator circuit means to the two parallel-connected inputs of the Cockroft-Walton multiplying circuits whereby the series-connected outputs of fthe two Cockroft-Walter multiplying circuits develop a high unidirectional voltage, voltage smoothing means connected to the series-connected outputs of the Cockroft-Walton multiplying circuits, potential divider means, a corona stabiliser in the potential divider means, means connecting the potential divider means to be energised from the smoothing means, a tapping point on the potential divider means, a source of reference voltage, comparing means connected to compare the voltage at the tapping point with the said reference voltage and operative to produce a control signal in response to any difference therebetween, and means connecting the output of the comparing means to the control input of the oscillator circuit means whereby the control signal adjusts the amplitude of the output of the oscillator circuit means in a direction tending to reduce the difference to zero.

2. A high voltage source according to claim 1, in which the oscillator circuit means is arranged to operate in class C, and including winding means coupled to the transformer means to provide feedback for the oscillator circuit means.

3. A high vvoltage source according to claim 1, in which the comparing means comprises a differential amplifier.

4. A stabilised high voltage source according to claim 1, in which the oscillator circuit means is arranged to operate in class C and includes winding means coupled to the transformer means to provide feedback for the oscillator circuit means, and in which the comparing means comprises a differential amplifier.

References Cited

UNITED STATES PATENTS

| | | | |
|---|---|---|---|
| 2,967,989 | 1/1961 | Eno et al. | 321—2 |
| 2,987,664 | 6/1961 | Poirier et al. | 331—113.1 X |
| 3,202,902 | 8/1965 | Glass | 321—2 |
| 3,427,525 | 2/1969 | Thornwall | 321—18 X |
| 3,428,807 | 2/1969 | Jones et al. | 321—18 X |

ROY LAKE, Primary Examiner

S. H. GRIMM, Assistant Examiner

U.S. Cl. X.R.

321—2, 15, 18; 331—183